United States Patent [19]

Le Gourvellec et al.

[11] Patent Number: 5,707,044
[45] Date of Patent: Jan. 13, 1998

[54] DEVICE FORMING A HYDRAULIC JACK AND USABLE IN A HYDROPNEUMATIC SUSPENSION FOR AUTOMOTIVE VEHICLES

[75] Inventors: Francois Le Gourvellec, Rambouillet; Yves Ney, Hayange, both of France

[73] Assignees: Automobiles Peugeot, Paris; Automobiles Citroen, Neuilly Sur Seine, both of France

[21] Appl. No.: 591,784

[22] Filed: Jan. 25, 1996

[30] Foreign Application Priority Data

Jan. 25, 1995 [FR] France .................. 95 00843

[51] Int. Cl.⁶ .................. B60G 17/00; F16F 5/00
[52] U.S. Cl. .................. 267/64.16; 267/218; 280/6.1; 180/41
[58] Field of Search .................. 267/64.16, 64.26, 267/64.11, 218; 188/322.22, 322.19, 314; 280/6.1; 180/219, 41

[56] References Cited

U.S. PATENT DOCUMENTS

| 2,984,501 | 5/1961 | Mercier . | |
|---|---|---|---|
| 3,944,198 | 3/1976 | Sakamoto | 267/64.26 X |
| 4,753,328 | 6/1988 | Williams et al. | 267/64.16 X |
| 5,009,400 | 4/1991 | Ott | 267/64.16 X |
| 5,145,206 | 9/1992 | Williams | 267/322.19 X |
| 5,219,152 | 6/1993 | Derrien et al. | 267/64.16 X |
| 5,271,485 | 12/1993 | Yowell et al. | 267/322.22 X |

FOREIGN PATENT DOCUMENTS

| 0 328 840 | 8/1989 | European Pat. Off. . |
| 2 080 095 | 11/1971 | France . |
| 2 401 037 | 3/1979 | France . |
| 2 654 992 | 5/1991 | France . |
| 1 260 998 | 2/1968 | Germany . |
| 1 430 900 | 7/1969 | Germany . |

OTHER PUBLICATIONS

"Interconnected Suspension Systems," *Automotive Engineer*, vol. 7, No. 4, Aug. 1982–Sep. 1982, GB, pp. 15–16.

*Primary Examiner*—Lee W. Young
*Attorney, Agent, or Firm*—Burns, Doane, Swecker & Mathis, L.L.P.

[57] ABSTRACT

A hydraulic jack includes three chambers (3, 4, 5), two of these three chambers being annular and enclosing a sliding cylindrical element (8) including a first piston (9) delimiting the two annular chambers (3, 4), and a second piston (10) delimiting the third, substantially cylindrical chamber (5) which is contiguous with one of the two annular chambers (3, 4). The hydraulic jack is used in hydropneumatic suspensions for automotive vehicles.

14 Claims, 1 Drawing Sheet

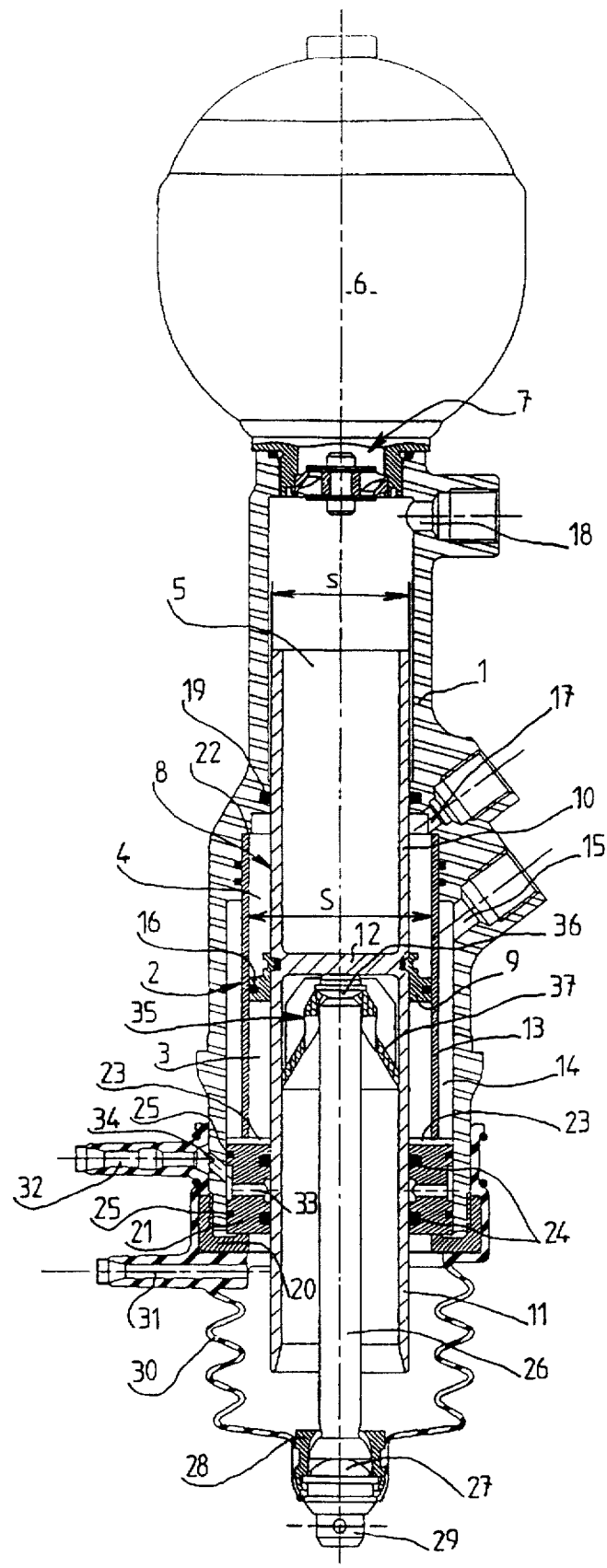

DEVICE FORMING A HYDRAULIC JACK AND USABLE IN A HYDROPNEUMATIC SUSPENSION FOR AUTOMOTIVE VEHICLES

BACKGROUND OF THE INVENTION

1. Field of the Invention

The present invention concerns a device constituting a hydraulic jack and usable, for example, in a hydropneumatic suspension intended for automotive vehicles.

2. Description of the Related Art

Conventional practice recognizes the use of jacks in hydropneumatic suspensions, each of these jacks containing three chambers, one of which is used to combat oscillation, and the two others, for the vehicle tilt-fighting function, the latter being arranged crosswise with the two tilt-fighting chambers of another jack on the same axle.

An axle of this type is described, for example, in European Patent No. A-0 201 425. However, the practical use of the jack described in this publication is not easily achieved, and poses difficult problems relating to the alignment and fluid-tightness of the chambers composing this conventionally-known jack.

OBJECTS AND SUMMARY

The invention proposes the practicable manufacture of a compact three-chamber jack providing optimal solutions to the problems of the prior art jacks.

To this end, the device forming the hydraulic jack according to the invention and usable, for example, in a hydropneumatic suspension for automotive vehicles includes a cylinder housing, a piston-equipped structure configured so as to delimit within the cylinder three self-contained chambers. Two of the three chambers are annular and enclose a sliding cylindrical element supporting, a first piston delimiting the two annular chambers, and a second piston delimiting the third, substantially cylindrical chamber contiguous to one of the two annular chambers.

Preferably, the sliding cylindrical element is composed of two coaxial tubular sections having the same diameter and whose opposite ends are open and separated from each other by an inner transverse partition, while the first piston, which possesses an overall ring shape, is mounted on, and coaxially to, one of the tubular sections in proximity to the transverse partition, and the other tubular section constitutes the second piston.

According to another aspect of the invention, the jack cylinder includes three orifices for fluid-feed of the three self-contained chambers, two of the feed orifices emptying directly into one of the annular chambers and into the third cylindrical chamber, respectively.

The first piston is mounted so as to slide in a cylindrical sleeve secured inside the cylinder of the jack, while delimiting, in conjunction with the cylinder, an annular space into which the third feed orifice empties and which connects with the annular chamber positioned opposite the chamber adjoining the third cylindrical chamber.

The cylindrical sleeve may be secured in the cylinder of the jack using an element forming a nut screwed into the cylinder in order to immobilize the sleeve, by means of a part serving as a bearing for the tubular section supporting the first piston, in a stopped position against an inner shoulder in the cylinder, and the part serving as the bearing includes at least one groove connecting the annular chamber with the annular space.

The device additionally includes a rod actuating the sliding cylindrical element, which is mounted coaxially in the tubular section supporting the first piston and of which one of the ends is housed in a support bearing which incorporates a socket and a tapered part centered on the tubular section and which facilitates insertion of the rod at the time of the installation.

The opposite end of the actuating rod is held supported on a socket by means of a position-retention piece connected to the cylinder by means of a protective bellows.

The device advantageously includes a first sealing joint arranged between the first piston and the cylindrical sleeve, and a second sealing joint arranged between the cylinder belonging to the jack and the tubular section. The tubular section constitutes the second piston in order to guarantee fluid-tightness between the third cylindrical chamber and the adjoining annular chamber. At least one third sealing joint is arranged between the bearing element and the other tubular section of the cylindrical element.

When the jack-forming device is used in a hydropneumatic suspension, the two annular chambers perform a tilt-fighting function, and the third cylindrical chamber serves to combat oscillation. The upper end of the cylinder delimiting the third cylindrical chamber connects with a hydropneumatic accumulator by means of a damping device.

BRIEF DESCRIPTION OF THE DRAWING FIGURE

The invention will be better understood and other purposes, characteristics, details, and advantages thereof will emerge more clearly during the following explanatory description provided with reference to the attached schematic drawing given solely as an example illustrating one embodiment of the invention, and wherein:

FIG. 1 is a cross-sectional view of a device forming a hydraulic jack according to the present invention.

DETAILED DESCRIPTION OF THE PREFERRED EMBODIMENT

The hydraulic jack device according to the invention will be described as it is used in an automotive hydropneumatic suspension, but it must be understood that this device may have other uses, for example in hydraulic transmissions of any type.

With reference to the single FIGURE, the hydraulic jack device includes a cylinder 1 which houses, in a sliding configuration, a piston-equipped structure 2 configured so as to delimit three self-contained chambers 3, 4, and 5 within the cylinder 1.

In the application under consideration, the two chambers 3, 4 provide for the vehicle tilt-fighting function, while chamber 5 serves to combat vehicle oscillation.

The piston-equipped structure 2 is connected to a wheel-support arm (not shown) in the manner described below, and the cylinder 1 is connected to the body of the vehicle. The upper end of the cylinder 1 connects with a membrane-equipped hydropneumatic accumulator 6 by means of a damping device 7, in accordance with conventional practice.

According to the invention, the two chambers 3, 4 are annular in shape and enclose a cylindrical element 8 mounted so as to slide in the cylinder 1. The cylindrical element 8 includes a first piston 9 delimiting the two annular chambers 3, 4, and a second piston 10 delimiting the substantially cylindrical third chamber which is contiguous to the annular chamber 4.

More specifically, the sliding cylindrical element 8 comprises two tubular sections, a first section 10 forming the second piston and a second section 11. The sections 10,11 are separated from each other by an inner transverse partition 12. The two tubular sections 10, 11 are coaxial, have the same diameter, and have open, opposite ends, thus enabling the tubular section 10 to delimit, in conjunction with the cylinder 1, the substantially cylindrical chamber 5.

The first piston 9, which has an overall ring shape, is mounted on, and coaxial with the tubular section 11 in proximity to the transverse partition 12. The piston 9 is mounted so as to slide in a cylindrical sleeve 13 secured in the cylinder 1. The cylinder and the cylindrical sleeve 13 delimit an annular space 14 into which a fluid-feed orifice 15 produced in the cylinder 1 empties. To ensure fluid-tightness between the two annular chambers 3, 4, a dynamic sealing joint 16 including a sliding joint and a sealing ring, is mounted on the piston 9 and in contact with the cylindrical sleeve 13.

The two chambers 4, 5 are supplied directly with fluid through two feed orifices 17, 18, respectively, formed in the cylinder.

A dynamic sealing joint 19 is also positioned between the cylinder 1 and the tubular section 10 forming the second piston, in order to guarantee fluid-tightness between the annular chamber 4 and the cylindrical chamber 5.

The cylindrical sleeve 13 is secured inside the cylinder 1 using an element forming a nut 20 and screwed into the cylinder 1, in order to block the translational motion of a cylindrical part 21 resting against one end of the cylindrical sleeve 13, whose opposite end is stopped against an inner shoulder 22 of the cylinder 1. The cylindrical element 21 acts as a friction bearing for the tubular section 11 of the sliding cylindrical element 8. Moreover, the part 21 comprises at least one, and preferably several transverse grooves 23 allowing establishment of a passage between the annular space 14 and the annular chamber 3. The element 21 further comprises two internal sealing joints 24 which ensure fluid-tightness in conjunction with the tubular section 11, and two external sealing joints 25 which ensure fluid-tightness in conjunction with the cylinder 1.

The sleeve 13 may also be immobilized in the cylinder 1 by crimping the corresponding end of the cylinder 1 on the bearing element 21, instead of using the nut element 20.

The sliding cylindrical element 8 is actuated by a rod 26 mounted in, and coaxially to, the tubular section 11 and whose lower end is held in place on a socket 27 by means of a position-retention piece 28 enclosing together the end of the rod 26 and the socket 27. This socket is attached to a shaft 29 which is fastened to the wheel-support arm. The position-retention piece 28 is attached to the cylinder 1 by means of a rubber protective bellows 30 fitted on the lower part of the cylinder 1. The bellows 30 protects the sliding element 8 against any corrosive attack from the outside. The bellows are molded in a single piece, and include a duct 31 for aeration of the bellows 30 and a duct 32 for collection of the inner seepage from the sliding element 8 which passes through the holes 33, 34 in the bearing element 21 and the cylinder 1, respectively.

The upper end of the rod 26 is housed in a support bearing 35 comprising a socket 36 and a tapered part 37 centered on the tubular section 11. The tapered part 37 facilitates the positioning of the rod 26 by the simple insertion of the rod until it is supported on the socket 36. The socket may be attached either to the partition 12, or to the tapered part 37.

The hydraulic jack device described above comprises three self-contained chambers designed to generate a force F with a minimum of friction. The hydraulic jack possesses a high degree of fluid-tightness between each of the chambers 3, 4, 5, while satisfying the equation $F=(P1-P2)(S-s)+P3s$, where P1, P2, and P3 are the fluid pressures in chambers 3, 4, and 5, respectively, S is the cross-section of the cylindrical sleeve 13, and s is the cross-section of the tubular section 10 forming the second piston.

Moreover, the design of the chambers is such that the hydraulic jack device possesses a compact shape.

The device according to the invention is not limited to the hydraulic tilt-fighting function, in accordance with which the chambers of the jacks on the same axle are arranged crosswise, but also applies to the anti-pitch function of a vehicle, in accordance with which the two jacks positioned on the same side of two different axles have chambers arranged crosswise to each other.

While the invention has been described in detail with reference to a preferred embodiment thereof, it will be apparent to one skilled in the art that various changes and modifications can be made, and equivalents employed, without departing from the spirit and scope of the invention.

What is claimed is:

1. Device forming a hydraulic jack comprising a cylinder housing a sliding piston-equipped structure configured so as to delimit in the cylinder first, second, and third self-contained chambers, wherein the first and second chambers are annular and enclose a sliding cylindrical element including a first piston delimiting the first and second annular chambers, and a second piston delimiting the third chamber which is a substantially cylindrical chamber contiguous to one of the first and second annular chambers, the sliding cylindrical element including two coaxial tubular sections having the same diameter, whose opposite ends are open, and which are separated from each other by a transverse inner partition, the first piston having an overall ring shape and being mounted on, and coaxially to, one of the tubular sections in proximity to the transverse partition, and the other of the two tubular sections forming said second piston.

2. Device according to claim 1, wherein the cylinder of the jack comprises three feed orifices for fluid-feed to the first, second, and third self-contained chambers respectively, one of the feed orifices emptying directly into one of the first and second annular chambers and another of the feed orifices emptying into the third cylindrical chamber.

3. Device according to claim 2, wherein the first piston is mounted so as to slide in a cylindrical sleeve secured in the cylinder of the jack, the cylindrical sleeve and the cylinder delimiting an annular space in which one of the feed orifices empties and which connects with the one of the first and second annular chambers positioned opposite the chamber adjoining the third cylindrical chamber.

4. Device according to claim 2, wherein the first piston is mounted so as to slide in a cylindrical sleeve secured in the cylinder of the jack, the cylindrical sleeve and the cylinder delimiting an annular space in which the third feed orifice empties and which connects with the one of the first and second annular chambers positioned opposite the chamber adjoining the third cylindrical chamber.

5. Device according to claim 1, wherein the cylinder of the jack comprises three orifices for fluid-feed to the first, second, and third self-contained chambers respectively, one of the feed orifices emptying directly into one of the first and second annular chambers and another of the feed orifices emptying into the third cylindrical chamber.

6. Device according to claim 5, wherein said device comprises a rod used to actuate the sliding cylindrical element and mounted coaxially in the tubular section carrying the first piston and one of whose ends is housed in a support bearing including a first socket and a tapered part centered on the tubular section and facilitating the insertion of the rod at the time of installation of the rod.

7. Device according to claim 6, wherein the opposite end of the actuating rod is held supported on a second socket by means of a position-retention piece connected to the cylinder by means of a protective bellows.

8. Device according to claim 1, wherein the first piston is mounted so as to slide in a cylindrical sleeve secured in the cylinder of the jack, the cylindrical sleeve and the cylinder delimiting an annular space in which the third feed orifice empties and which connects with the one of the first and second annular chambers positioned opposite the chamber adjoining the third cylindrical chamber.

9. Device according to claim 8, wherein the cylindrical sleeve is secured inside the cylinder of the jack by means of an element forming a nut screwed to the cylinder by means of a part forming a bearing for the tubular section, in order to immobilize the sleeve in the stopped position against an inner shoulder in the cylinder, and wherein the part forming the bearing includes at least one groove connecting the annular chamber with the annular space.

10. Device according to claim 9, wherein said device comprises a first sealing joint arranged between the first piston and the cylindrical sleeve, a second sealing joint arranged between the cylinder and the tubular section forming the second piston in order to ensure fluid-tightness between the third cylindrical chamber and the adjoining annular chamber, and at least one third sealing joint arranged between the part forming the bearing and the other tubular section of the cylindrical element.

11. Device according to claim 1, wherein said device comprises a rod used to actuate the sliding cylindrical element and mounted coaxially in the tubular section carrying the first piston and one of whose ends is housed in a support bearing including first socket and a tapered part centered on the tubular section and facilitating the insertion of the rod at the time of installation of the rod.

12. Device according to claim 11, wherein the opposite end of the actuating rod is held supported on a second socket by means of a position-retention piece connected to the cylinder by means of a protective bellows.

13. Device according to claim 1, wherein the first and second annular chambers are chambers providing for a tilt-fighting function, and the third chamber is for combatting oscillation.

14. Device according to claim 13, wherein an upper end of the cylinder delimiting the third cylindrical chamber connects with a hydropneumatic accumulator by means of a damping device.

* * * * *